United States Patent [19]

Andersson

[11] Patent Number: 4,934,407

[45] Date of Patent: Jun. 19, 1990

[54] MANIFOLD FOR GAS FROM PARALLEL-WORKING GAS CLEANING UNITS

[75] Inventor: Karl-Erik Andersson, Finspong, Sweden

[73] Assignee: ABB Stal AB, Sweden

[21] Appl. No.: 314,741

[22] Filed: Feb. 24, 1989

[30] Foreign Application Priority Data

Feb. 29, 1988 [SE] Sweden ................................ 8800697

[51] Int. Cl.[5] ................................................ F17D 1/02
[52] U.S. Cl. ...................... 137/602; 55/349; 55/410; 55/419; 60/39,464; 137/561 A
[58] Field of Search .......... 137/602, 605, 606, 561 A, 137/896; 55/349, 410, 419; 60/323, 39.12, 39.464, 39.092

[56] References Cited

U.S. PATENT DOCUMENTS

| 3,507,301 | 4/1970 | Larson | 137/602 |
| 3,794,056 | 2/1974 | Warren | 137/561 A |
| 4,460,390 | 7/1984 | Muller et al. | 55/346 |
| 4,600,414 | 7/1986 | Metcalfe et al. | 60/39.464 X |

FOREIGN PATENT DOCUMENTS

| 98350 | 6/1964 | Denmark . | |
| 1078999 | 4/1960 | Fed. Rep. of Germany . | |
| 1351028 | 12/1963 | France | 137/602 |
| 560178 | 4/1957 | Italy | 60/323 |
| 140369 | 5/1953 | Sweden . | |
| 18745 | 10/1895 | United Kingdom | 137/561 A |
| 199684 | 6/1923 | United Kingdom . | |

Primary Examiner—Stephen M. Hepperle
Attorney, Agent, or Firm—Pollock, Vande Sande & Priddy

[57] ABSTRACT

A manifold receives gas streams from a plurality of gas purifiers arranged in parallel. The manifold comprises a plurality of pipe portions wiht a successively increasing diameter forming a main channel in the manifold. A first pipe portion projects into a second pipe portion, whereby, in the gap between the pipe portions a connection channel is formed which is substantially parallel to the main channel. The second pipe portion projects into a third pipe portion, thus forming a gap between the pipe portions and so on. Outlet tube portion from cyclones are connected to the connection channels.

7 Claims, 2 Drawing Sheets

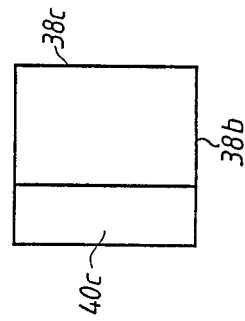
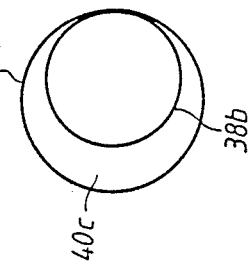
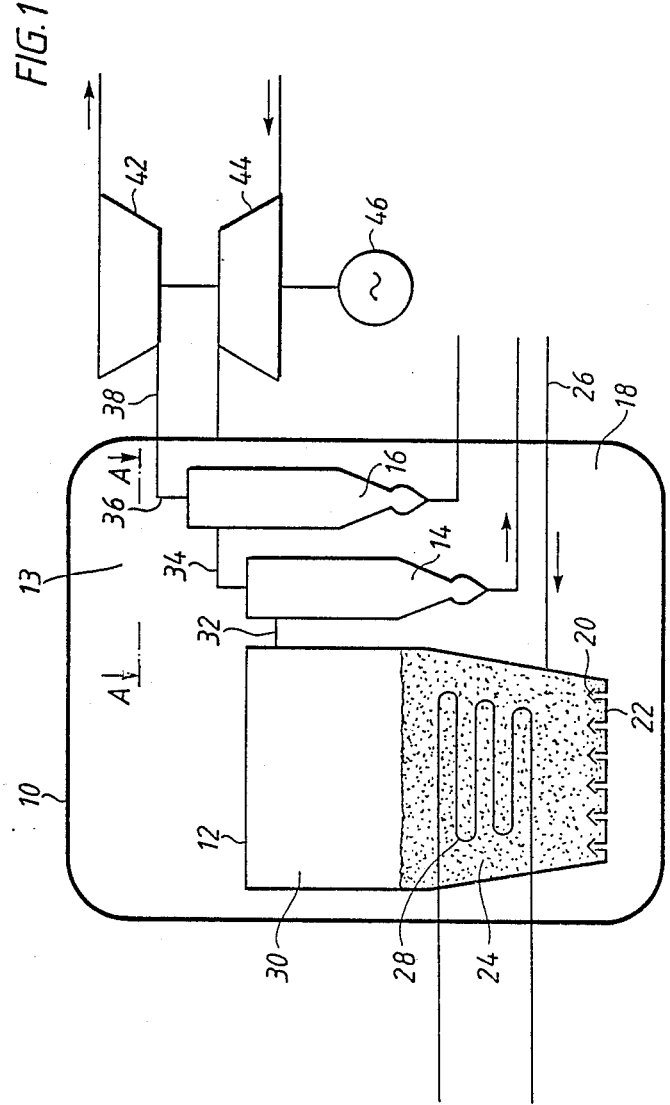

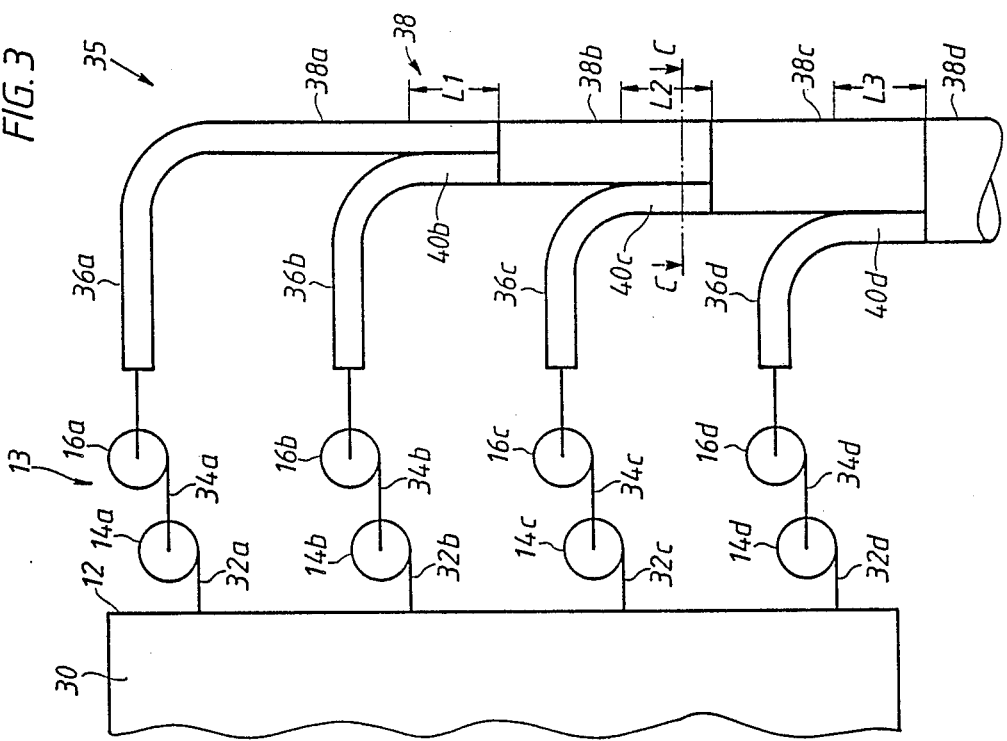
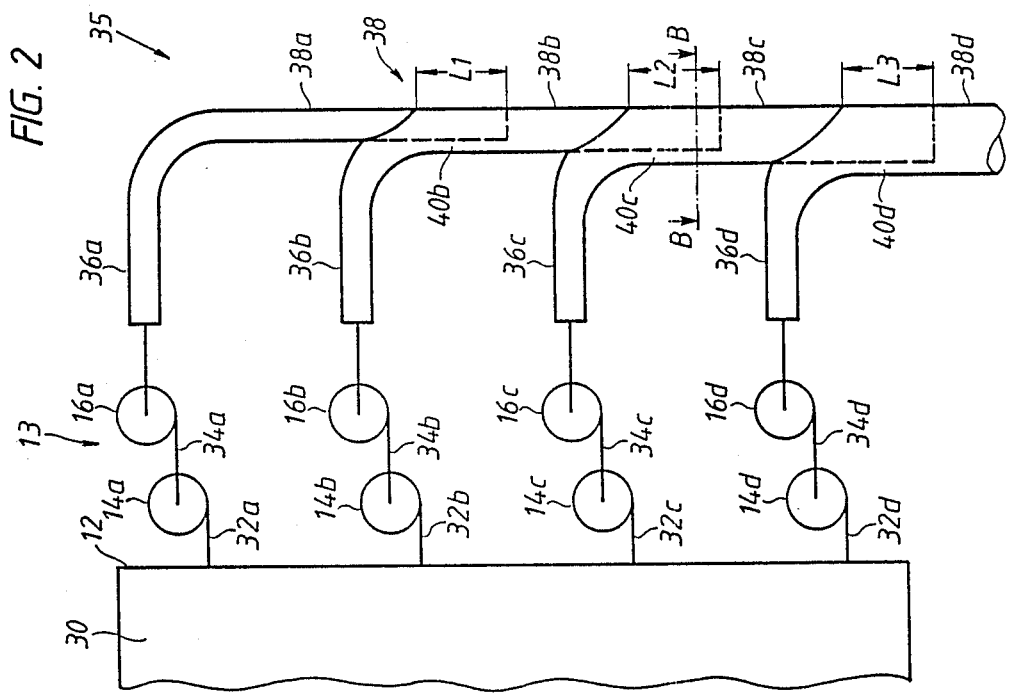

MANIFOLD FOR GAS FROM PARALLEL-WORKING GAS CLEANING UNITS

TECHNICAL FIELD

The present invention relates to a manifold for receiving gas streams from a number of parallel-working gas cleaning units. It is primarily intended to receive purified gas from gas cleaners operating in parallel, for example cyclones in a PFBC power plant in which the combustion gases from a combustor are utilized for operation of one or more gas turbines. "PFBC" are the initial letters of the English expression Pressurized Fluidized Bed Combustion.

BACKGROUND ART

In a plant comprising a plurality of parallel groups of gas cleaners, it is important that the connections to a common manifold which receives the purified gas are so designed that the pressure conditions at the connections are equal. In prior art designs this has not been the case. The flow in the parallel-working cleaners has become different. Therefore, it has not been possible to attain an optimum cleaning efficiency. In a PFBC power plant in which cleaners are located in an expensive pressure vessel and the gas is utilized for operation of turbines, it is particularly important for the cleaning plant to operate with optimum efficiency so that the size can be limited while maintaining a good dust separation and a small dust load in the propellent gases of the turbine.

SUMMARY OF THE INVENTION

According to the present invention, a uniform load in parallel-working cleaners is obtained by a special design of the connecting channel from a cleaner to the main channel of the manifold. The connection channel is parallel to the manifold main channel, and the cross-sectional area of this channel is such that the velocity of flow becomes the same as in the main channel. At the mouth of the connecting channel the area of the manifold main channel increases with the area of the connecting channel. The length of the connecting channel, which is parallel to the manifold main channel, is at least equal to the diameter of a tube having the same area as the channel. Suitably, the length is more than twice this diameter.

The manifold may consist of a number of tubes having diameters increasing in steps. In one embodiment, a connecting tube projects into a tube which is enlarged at the connection. The connection channel is formed by the gap between this enlarged tube and the tube projecting thereinto. In another embodiment the connection channel may consist of a tube which is substantially parallel to a tube forming a part of the main channel. The area of the main channel tube increases with the area of the connecting tube at the mouth of the connecting tube. In a PFBC power plant a number of groups of series-connected cyclones are connected to the manifold.

BRIEF DESCRIPTION OF THE DRAWING

The invention will be described in greater detail with reference to the accompanying drawing, wherein FIG. 1 schematically shows a PFBC power plant, FIGS. 2 and 3 show a view of the combustor, the cyclones and a manifold connecting the cyclones to gas tubes for transporting purified gases to a turbine according to A—A in FIG. 1, FIG. 4 shows a section through the manifold according to B—B in FIG. 2, and FIG. 5 shows a section through the manifold according to C—C in FIG. 3.

DESCRIPTION OF THE PREFERRED EMBODIMENT

In the figures, 10 designates a pressure vessel. The pressure vessel 10 comprises a combustor 12 and a gas purification plant 13 having a plurality of parallel groups of series-connected cyclones 14 and 16 for purifying the combustion gases. Only one such group is shown in FIG. 1. The space 18 between the pressure vessel 10 and the combustor 12 contains compressed combustion air. The pressure may amount to 2 MPa or more. Combustion air is supplied to the combustor 12 via nozzles 20 in the air-distributing bottom 22. This air fluidizes a bed 24 of particulate material and burns a fuel, usually coal. Fuel and bed material are supplied to the bed 24 via the feed pipe 26. The combustor 12 includes tubes 28 which generate steam for a steam turbine (not shown). The combustion gases are collected in the freeboard 30 above the bed 24 and are passed to the cyclones 14 and 16 in the pipes 32 and 34. The last cyclone 16 in the groups of parallel cyclones 14, 16 is connected to a manifold 35. This manifold 35 consists of tubes 36a–d and tubes 38a–d forming the inlet channels 40b–40d and the main channel, respectively. The tube 38d of the manifold 35 is connected to a tube supplying propellent gas to the turbine 42. The turbine 42 drives a compressor 44 which supplies the space 18 with compressed combustion air and a generator 46.

As shown in FIGS. 2 and 3, the purification plant 13 consists of parallel groups of cyclones 14a–d and 16a–d which are connected to the combustor 12 by the pipes 32a–d and which are connected between themselves by pipes 34a–d. The cyclones 16a–d are connected to the tubes 36a–d forming the inlet channels of the manifold 35 each having the area A. The tube parts 38a–d form the main channel of the manifold 35 with the areas A, 2A, 3A and 4A. The velocity of flow V becomes equal in the whole main channel of the manifold formed by the tubes 38a–d in case of equal flow through the parallel groups of cyclones.

In the embodiment according to FIGS. 2 and 4, the main channel of the manifold 35 consists of tube parts 38a–d having circular cross-section. The first tube part 38a of the pipe 38 projects into the second tube part 38b by a distance L1, the second tube part 38b projects into the third tube part 38c by a distance L2, the third tube part 38c projects into the fourth tube part 38d. Between the tube parts 38a and 38b, 38b and 38c, and 38c and 38d of the manifold 35, gaps 40b, 40c and 40d, respectively, are formed, the lengths L1, L2, L3, etc., of which increase with the area of the tube parts 38b–d at the connection. The tube parts 38b, 36c and 36d are connected to these gaps. The gaps 40b–d form channels, parallel to the main channel of the manifold 35 ahead of the terminating point of the gaps 40b–d. An undisturbed gas flow connection is obtained since the direction of flow and the velocity of flow at the mouths of the channels are the same as in the main channel of the manifold upstream of the mouth. No pressure differences, which may cause the flows through the groups of cyclones to become different, will arise.

In the embodiment according to FIGS. 3 and 5, the connection channels and the main channel of the manifold 35 consist of rectangular tubes 36*a–d* and rectangular tubes 38*a–d*, respectively. Ahead of the connection to the main channel of the manifold 35, the tube parts 36*b–d* are formed by the tube parts 38*a–d* parallel to the tube parts 38*a–d*. At the mouth of the tube parts 36*b–d* the area of the main channel formed by the tube parts 38*a–d* increases with the area of the tube parts 36*b–d*.

What is claimed:

1. A manifold for receiving gas streams from a plurality of parallel-working equipment, preferably gas purifiers of the cyclone type, said manifold comprising a connection channel at the connection of each of gas streams to a main collecting channel, each of said connection channels extending substantially parallel to said main collecting channel and wherein the area of said main collecting channel increases in such a way that the gas velocity in said connection channels and said main collecting channel are substantially equal.

2. A manifold according to claim 1, wherein the length of said connection channel is at least equal to the diameter of a tube having the same cross-section as the connection channel.

3. A manifold according to claim 1, wherein said manifold includes a plurality of pipe portions with a gradually increasing area at the point where an upstream pipe portion projects into a subsequent downstream pipe portion by a predetermined distance and wherein said connection channel is defined by a gap formed between said pipe portions.

4. A manifold according to claim 1, wherein the connection channel consists of a pipe which is parallel to the main collecting channel, and wherein said area of the main collecting channel increases with the cross-area of said connection channel at the mouth thereof into said main collecting channel.

5. A manifold according to claim 1, wherein purified gas from a number of gas purifiers, primarily cyclones, is collected for purification of gas from a combustor in a PFBC power plant.

6. A manifold according to claim 2, wherein said manifold includes a plurality of pipe portions with a gradually increasing area at the point where an upstream pipe portion projects into a subsequent downstream pipe portion by a predetermined distance, and wherein said connection channel is defined by a gap formed between said pipe portions.

7. A manifold according to claim 1, wherein said connection channel includes a pipe which extends parallel to said main collecting channel, and wherein the area of said collecting channel increases with the area of said connection channel at the mouth thereof into said main collecting channel.

* * * * *